Patented June 10, 1930

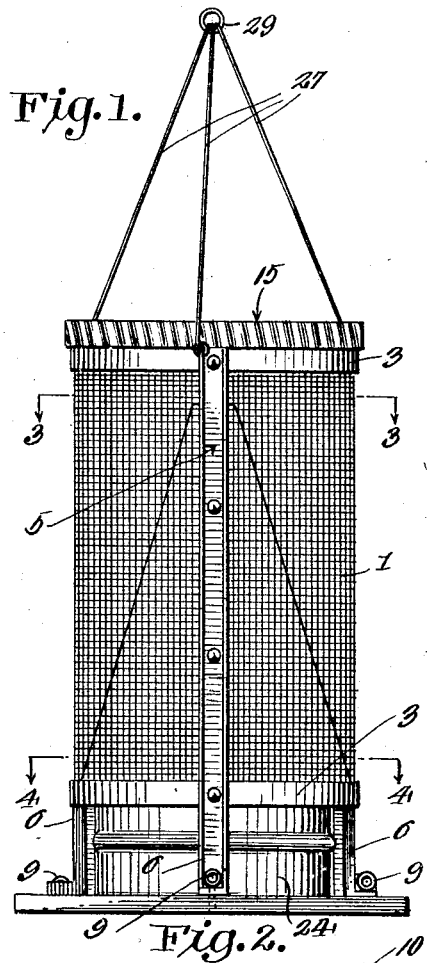
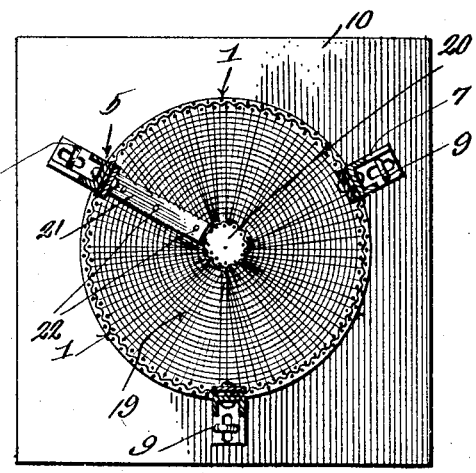
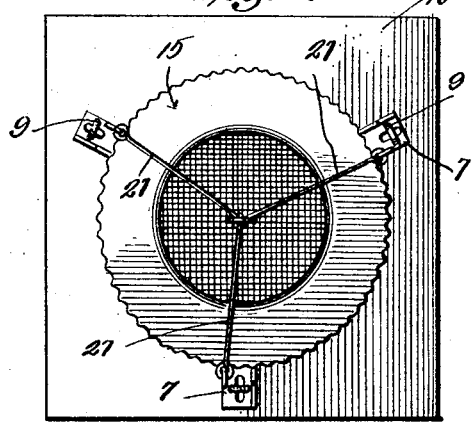
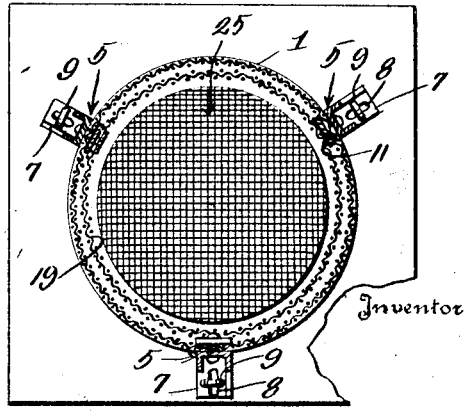

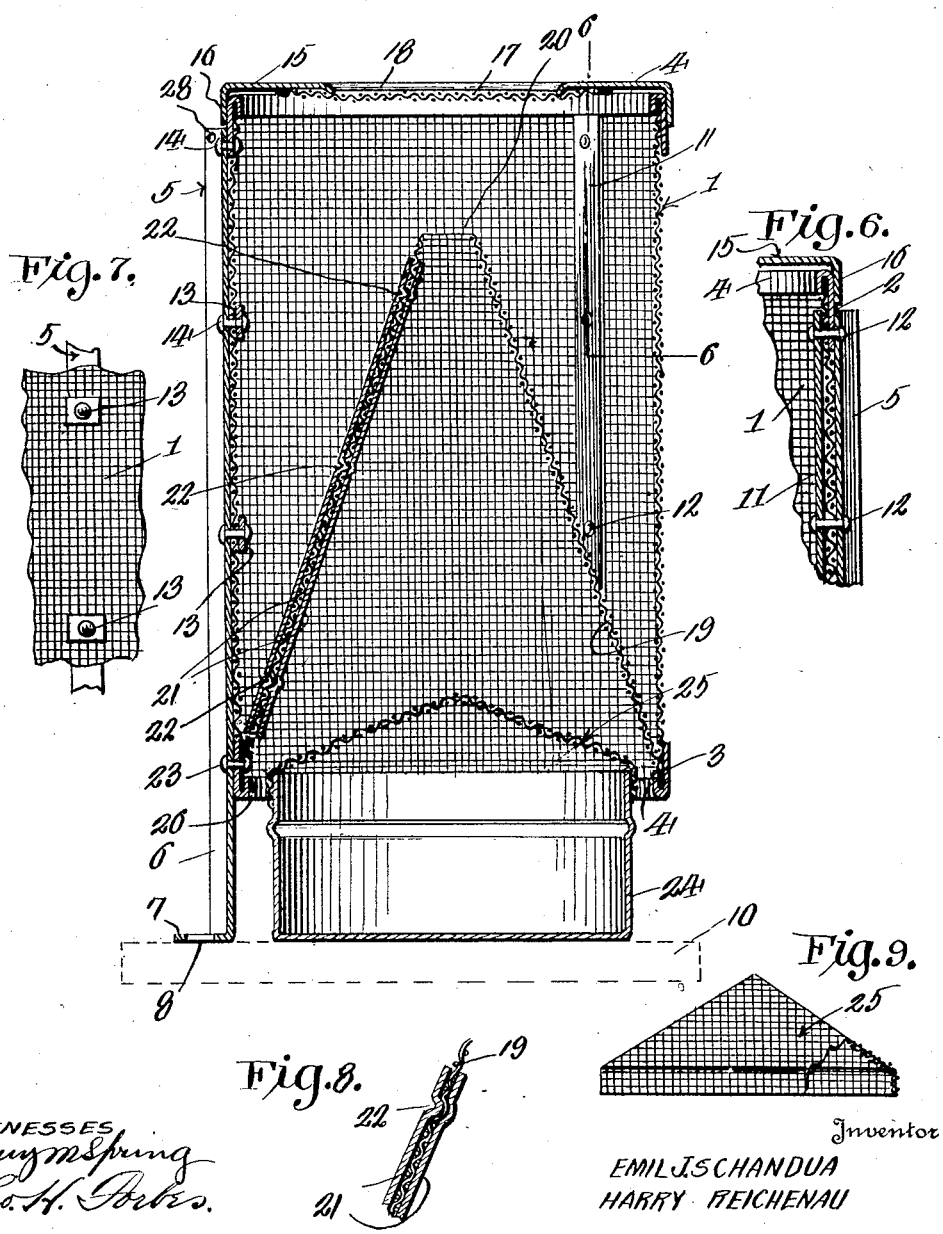

1,762,668

UNITED STATES PATENT OFFICE

EMIL J. SCHANDUA AND HARRY REICHENAU, OF FREDERICKSBURG, TEXAS

BLOWFLY TRAP

Application filed September 22, 1927. Serial No. 221,290.

This invention relates to the class of insect traps and pertains particularly to a fly trap.

The primary object of the present invention is to provide a fly trap of improved construction which will be strong and durable, efficient, and comparatively inexpensive to manufacture.

The invention broadly contemplates the provision of the vertical cylinder of screen wire having a removable closure at the upper end and which is supported upon leg members in such manner that the lower end is raised a substantial distance above the supporting surface. Within this cylinder a relatively long cone is positioned the base edge of which is secured to the lower edge of the cylinder and is open while the apex is provided with an apperture and is located adjacent the upper end of the cylinder. Associated with the screen cylinder is a bait receptacle the upper end of which is open and extends a slight distance into the cone and is spaced from the rim of the cone and the cylinder into which it extends to provide an annular passageway for the insects. The top of this base container is covered with a wire mesh to prevent the insects reaching the bait.

The invention will be best understood from a consideration of the following detailed description taken in connection with the accompanying drawings forming a part of the present specification with the understanding, however, that the invention is not confined to any strict conformity with the showing of the drawings but may be changed or modified so long as such changes or modifications mark no material departure from the salient features of the invention as expressed in the appended claim.

In the drawings:

Figure 1 shows the structure embodying the present invention in side elevation, showing the supporting base therefor and means attached to the upper end for suspending the trap, if desired.

Figure 2 is a top plan view of the structure shown in Figure 1.

Figure 3 is a transverse section taken upon the line 3—3 of Figure 1.

Figure 4 is a transverse section taken upon the line 4—4 of Figure 1.

Figure 5 is an enlarged longitudinal section through the trap section.

Figure 6 is a section taken upon the line 6—6 of Figure 5.

Figure 7 a fragmentary view looking at the inner face of the screen wall showing the manner in which the screen is secured to the supporting standards.

Figure 8 is an enlarged detail in longitudinal section of the clamping members which hold the adjacent edges of the cone structure together.

Figure 9 is a view in side elevation of the screen bait pan cover.

Referring to the drawings in detail wherein like numerals of reference indicate corresponding parts throughout the several views, the trap structure comprises a vertically arranged wire screen cylinder indicated as a whole by the numeral 1, the top and bottom edges of which are surrounded by the metal rings 2 and 3 respectively, which rings have their outer edges doubled and turned back as indicated at 4 to clamp the adjacent edge of the screen body.

Extending longitudinally of the outer face of the screen cylinder body 1 is a plurality of equi-distantly spaced rib bars 5 each of which extends a substantial distance beyond the lower edge of the screen body 1 to set up the supporting legs 6, which legs are turned outwardly to provide the feet 7 having the slots 8 formed therethrough for the reception of securing screws 9 or other appropriate securing devices carried by a base member 10. This base structure may be removed from the trap if desired but it is preferred in the position shown for the purpose hereinafter to be described.

The meeting side edges of the cylinder screen 1 overlie the inner face of one of the reinforcing ribs 5 and extending longitudinally of the face of this particular rib and securing said screen edges thereto is a retaining strip 11, the bolts or rivets 12 being passed through the strip 11 and the adjacent rib or reinforcing member 5 to securely clamp the edges of the wire cylinder in position. At spaced intervals throughout the length of the other rib or reinforcing member 5 there are secured to the inner face of the wire body 1 the plate members 13 through each of which an appropriate securing element 14, such as a rivet or bolt is passed to extend through the adjacent member 5 for the purpose of holding the screen body securely thereto.

The top of the screen cylinder 1 is covered by an annular plate 15 having the outer periphery turned downwardly to provide the engaging flange 16 which surrounds the top ring 2 in the manner shown. The central open portion 17 of the annular plate 15 is covered by a screen wire 18 thereby completely closing the upper end of the cylinder 1.

Within the cylinder there is mounted a cone body indicated as a whole by the numeral 19. As shown this cone is of foraminous material and is open at the bottom or base and has an aperture formed through the apex, as indicated at 20. This cone is formed of a single body of screen wire and the meeting edges thereof are held together by the opposed clamping strips 21, the strips having punches or indentations 22 formed at spaced intervals throughout their length to clamp the edges of the wire therebetween. The edge of the basal portion of the cone 19 is secured to the bottom ring 3 of the cylinder 1 by means of rivets or other appropriate securing devices 23, as is clearly shown in Figure 5.

Associated with the foregoing structure is a bait receptacle 24 which rests upon the base 10 and is of sufficient height to extend into the lower portion of the cylinder 1 and the cone 19. The top of this receptacle is open and is covered securely by a pitched top wire mesh cover 25 illustrated in Figure 9, the edge of which cover is secured to the peripheral portion of the container 24 as shown.

The container is of materially less over all diameter than the interior diameter of the lower portion of the cylinder 1 and from this it will be readily understood that an entrance passageway is formed about the upper portion of the container 24 into the cone 19 as indicated by the numeral 26.

If it is desired to suspend the fly trap, the link bodies 27 are engaged in the apertures 28 formed in the upper end of the members 5 and are secured together at opposite ends by the suspension ring 29. In this manner the trap may be readily supported in a swinging position.

From the foregoing description it will be readily understood that with bait in the container 24 the flies will pass through the passage 26 for the purpose of reaching the bait but will be prevented from doing so by the screen cover 25. In view of the known fact that flies seldom will pass downwardly through a passageway, the flies after reaching the interior of the cone 19 will work their way upwardly to the opening 20 in the apex through which they will pass into the cylindrical cage 1 where they will remain as they will not pass downwardly through the opening 20 back into the cone 19. When the trap is to be emptied the cover 15 can be readily removed after the flies have been killed in an appropriate manner.

Having thus described our invention what we claim is:

An insect trap of the character described, comprising a base, a vertical screen cylinder, a band fitted about the upper end of said cylinder and having the edge thereof turned downwardly over the adjacent cylinder edge, an elongated foraminous cone arranged vertically within said cylinder and having the base edge abutting the cylinder at the lower end thereof and an outlet opening at the apex thereof, a reinforcing band arranged about the lower end of said cylinder and having the lower edge turned upwardly to overlie the cylinder edge and adjacent base edge of said cone, vertically arranged supporting bars connecting and secured to said bands, said bars having the lower ends extended beyond the lower edge of the cylinder and bent outwardly to provide supporting feet resting upon and secured to the base, a bait receptacle of smaller diameter than the cylinder and cone and arranged upon the base beneath and extending into the lower end of the cylinder and cone, and reinforcing bars extending longitudinally of the inner face of the cylinder each in opposition to and secured to an exterior longitudinally extending bar.

In testimony whereof we affix our signatures.

EMIL J. SCHANDUA.
HARRY REICHENAU.